May 9, 1961  H. T. BETZ ET AL  2,983,190
PROJECTION PICTURE SCREEN
Filed Aug. 8, 1958
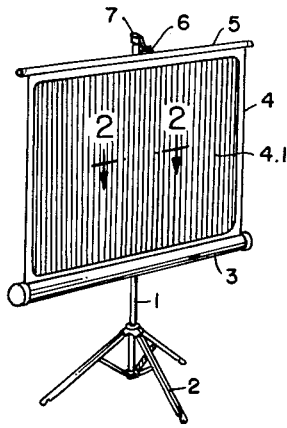
FIG. I
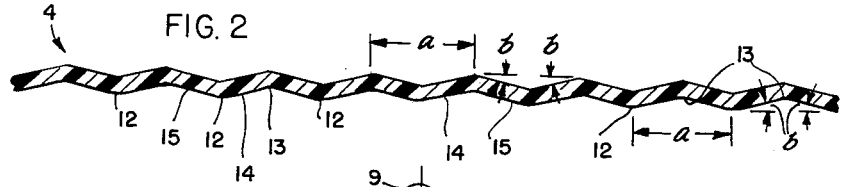
FIG. 2
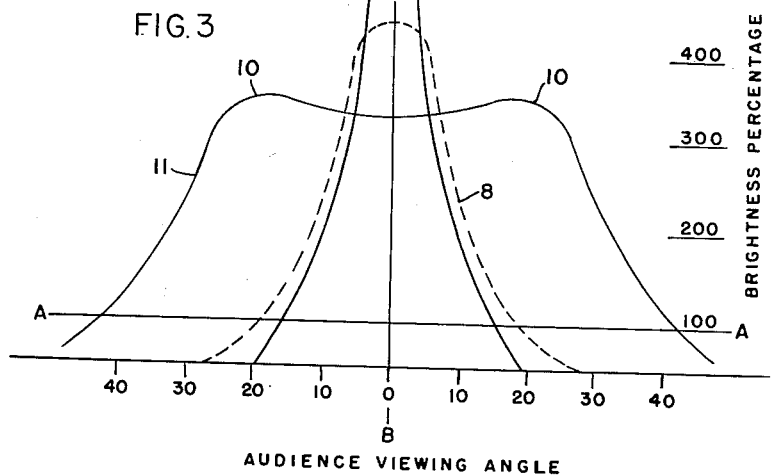
FIG. 3
AUDIENCE VIEWING ANGLE
*INVENTORS:*
HOWARD T. BETZ
HAL L. SOWERS
BY Rummler + Suow
ATT'YS

United States Patent Office 2,983,190
Patented May 9, 1961

2,983,190

PROJECTION PICTURE SCREEN

Howard T. Betz, Chesterton, Ind., and Hal L. Sowers, Skokie, Ill., assignors, by mesne assignments, to Da-Lite Screen Company, Inc., Warsaw, Ind., a corporation of Illinois Filed Aug. 8, 1958, Ser. No. 753,926

8 Claims. (Cl. 88—28.9)

This invention relates to projection picture screens and particularly to improvements in form and structure of the reflective surface of such screens to obtain a wider horizontal viewing range of substantially uniform brightness.

The primary function of projection picture screens being to reflect the projected picture with maximum brightness, the particular efforts of the screen designers have been directed to providing screen surfaces which would have minimum light absorption and true reflective characteristics for the entire band of visible light emanations; and to provide these features for a flexible screen material, as is particularly necessary for portable screens, that will retain the desired reflective capacity over a long life period and regardless of ordinarily encountered conditions of use and storage.

These results have been substantially achieved. However, the angular width or spread of the reflected light for good observation has been limited and the problem of providing a horizontally wide angular distribution of the reflected light, while maintaining a substantially uniform brightness, has not heretofore been adequately solved.

Thus, the main objects of the present invention are to provide an improved projection picture screen having a reflective surface capable of providing a substantially uniform brightness of the reflected image throughout a greatly increased viewing angle or observation field; to provide an improved form of picture screen reflective surface; to provide such a reflective surface that may be applied to flexible fabrics for portable picture screens; to provide an improved formation for reflective surface that can be flexed repeatedly, or rolled and stored for long periods, without deterioration of the desired wide angle uniform brightness characteristics; to provide such a reflective surface form that can be applied readily to any suitable screen materials; to provide an improved picture screen which produces brighter pictures from a given projector wattage and permits a greatly increased viewing angle; and to provide such a screen which will produce a wider distribution, with uniform brightness, and at the same time substantially obviate reflection of ambient light into the viewing field.

A specific embodiment of this invention is shown in the accompanying drawings in which:

Figure 1 is a perspective view of a portable picture screen in which the present invention may be employed in the reflective surface formation.

Fig. 2 is a fragmentary sectional view of a reflective screen, as taken on line 2—2 of Fig. 1, showing the improved surface formation thereof, and Fig. 3 is a diagrammatic view illustrating on a brightness scale the angular distribution of the reflected image from a screen according to the present invention as compared with that obtained from a conventional beaded or silver specular type of screen.

In the form shown in the drawings the invention is embodied in a projection picture screen of the portable type comprising a stand 1 having a foldable tripod base 2, a screen roller case 3 from which a screen 4, having a specular surface providing an image reflecting area 4.1, is extended and hung by a top bar or slat 5 from a suitable hook 6 at the upper end of a telescopically adjustable vertical extension 7 of the stand. The screen, itself, is preferably a single sheet of flexible material, attached at one end to a spring roller (not shown) housed within the case 3, and suitably attached at the other end to the top bar 5 which in turn is provided with suitable suspension means for attachment to the hook 6 on the extension 7. It will be understood, however, that the size of the screen and the nature of its mounting are wholly independent of the present invention and the embodiment of Fig. 1 is intended only to illustrate a typical example of its use. In any case the object of the screen mounting is to achieve a suspension of the screen in a uniformly flat plane.

The invention is shown in detail in Fig. 2 and in this regard the essential concept of the invention is to form the reflecting surface of the screen with an over-all configuration of continuous, vertically extending, laterally intersecting, narrow flat surfaces, each of which is disposed at the same predetermined angle to the plane of the screen but in alternately opposite directions with respect to one face of the screen, whereby the angle of horizontal distribution of reflected light beams from the screen is greatly widened with respect to the projection axis without noticeable loss of uniformity of image brightness over the entire viewing range.

Ordinarily vertical distribution of the reflected projected light presents no serious problem, because the projector and the viewers are normally arranged in one horizontal plane relative to the area of the screen, however, the angle of maximum horizontal distribution automatically limits the practicable field of observation due to the sharp decline of image brightness as the observer moves outwardly from the projection axis and with ordinary projection screens this decline is so rapid that the minimum comfortable brightness level is reached within an audience viewing angle of only 20 to 25° from the projection axis. This is shown by the broken line 8 in Fig. 3, where the ordinate of the diagram is scaled in arbitrarily chosen units with the value of a "Lambertian" reflector being equal to 100 (a "Lambertian" reflector being a perfect diffuser), with the line A—A indicating this level for reference purposes, and where the abscissa is scaled in degrees of angular width of the viewing field with reference to the projection axis B—B.

However, by forming the specular surface contour of the screen according to the present invention the axis brightness is reduced somewhat over that obtained from the same material in flat condition, indicated by the curve 8.1, and, instead of being concentrated in a single lobe 9, as in the brightness curve 8.1, is spread laterally and cumulatively to form two lobes 10, as in the curve 11, which are symmetrically disposed on both sides of the axis B—B. Thus, while the fall-off of brightness from the peaks 10 is at substantially the same rate as in the single lobe curves 8 and 8.1 the peaks are spread apart as in the curve 11 of Fig. 3 and result in substantially doubling of the useful audience viewing angle.

Fig. 2 illustrates the manner in which this result is accomplished by the present invention and as shown the specular surface contour of the screen 4 is formed with alternate ridges 12 and valleys 13 created by narrow substantially planar surfaces, 14 and 15, alternately angulated from the plane of the screen and extending continuously between the top and bottom margins of the image reflecting area 4.1 in parallel relation with each other.

The range of widths for the angulated planar surfaces 14 and 15 and the range for the amount of their angulation from the plane of the screen are critical. The width is critical, since striae formed by the individual reflection bands comprising the alternately flat surfaces must be unresolved by the human eye, i.e. beyond the visual resolving power, at the nearest practicable viewing distance from the screen. Also, the lines of the crests and valleys between the flat surfaces must be indiscernible. The angle is critical since it controls the brightness distribution about the projection axis; and the resulting decrease of brightness on the projection axis must not be noticeably less than the brightness at the sides of the image area.

Thus, it has been discovered that for the best practicable results the space between adjacent ridges, or the distance "a" from ridge crest to ridge crest, Fig. 2, should be as uniform as possible and within the range of 1/32" to 3/64". Under normal projection conditions, the screen should not be viewed from closer than a distance equal to at least twice the width of the screen, i.e. six to ten feet for an ordinary portable screen, and at such a distance spaces 3/64" wide between adjacent ridges are unresolved by the normal human eye. Also such a spacing of the ridges on the screen surface is within the range of commercially practicable manufacture with standard production facilities and commercially available screen materials.

The angulation of the flat vertically extending surfaces 14—15 which comprise the sides of the ridges 12 should be such that the included angle "b" between the plane of the screen body 4 and the plane of each of the surfaces 14—15 will not be less than 9 degrees and not greater than 15 degrees; and the width of all of the flat surfaces must be as nearly the same as possible. We have found that the smaller the said included angle is, the more narrow will be the viewing angle or field. That is the smaller the included angle the more nearly will the brightness distribution curve approach the curve 8.1 of Fig. 3 with its single lobe of maximum brightness 9. Conversely, we have found that the larger the angle between the elements 14—15 and the plane of the screen body, the wider will be the distribution of the reflected light. This is due to the splitting of the single brightness curve lobe 9, of the curve 8.1, into two lobes 10 equally spaced from the projection axis as in the curve 11; and, as a consequence, as the two lobes 10 are spread apart from the projection axis the brightness at the center of the resulting curve falls below the value at the crests of the two lobes 10.

It is known that the normal human eye can perceive a brightness variation of from 5 to 10 percent. Therefore the brightness variation between the two lobes 10 of the distribution curve 11 should be not more than 5 percent to obtain optimum uniformity of brightness. Thus we have found that the range of 9 degrees to 15 degrees for the angulation of the surfaces 14 and 15 relative to the plane of the screen body is critical for optimum results from the finished product. An angulation of less than 9 degrees does not improve the brightness distribution over that of an ordinary screen. And an angulation of more than 15 degrees causes a lack of brightness uniformity over the image reflecting area. Also the crests 12 of the ridges and the valleys 13 between the ridges are preferably slightly curved or rounded in transverse cross section on a plane normal to the plane of the screen body, as this has been found to flatten the curve between the lobes 10 of the distribution curve 11, as shown in Fig. 3.

Thus, the improved form of projection screen reflecting surface contour, in reducing the screen brightness at the projection axis, spreads the brightness of the reflected light laterally from the axis and adds what is removed from the curve 8 of the ordinary screen to each of the lobes 10 of the new curve 11 cumulatively and results in a wider distribution of practically uniform brightness so that the audience viewing angle or range is more than doubled without serious loss of brightness.

In the manufacture of the improved picture projection screen any suitable material may be employed, and the reflecting surface contour may be formed by any suitable means that will produce uniform ridges, of substantially equal size and spacing, within the dimensioned limitations above stated. In actual production screens have been successfully made of vinyl films, coated with uniformly distributed silver or aluminum particles and a suitable protective coating to provide a lasting specular surface, and then rolled between accurately formed embossing rolls to provide the desired surface contour. It will be understood, however, that other materials may be employed for the screen body and for the specular surface and that other means than embossing rolls may be used to form the specular surface contour.

Also production screens having surface contour dimensions of 3/64 of an inch from crest to crest of the ridges (dimension "a" of Fig. 2) and 13 degrees for the angle between parallelly extending flat surfaces and the plane of the screen body (angle "b" of Fig. 2) have been found to produce very satisfactory results.

The standard perfect diffuser is a magnesium oxide coating on a magnesium carbonate block and was the basis for our measurement of the brightness of a given specular surface. We measured brightness of that surface compared to the brightness of the standard, the light source in each case being the same.

With a projection picture screen specular surface we are only concerned with brightnes sand the distribution of brightness, to widen the viewing angle as much as can be practicably done.

For any projector the level of illumination delivered to the surface of a screen depends upon the light source, the optical system, film density, and the distance from the projector to the screen. The prime function of a screen surface is to redirect the light incident on the screen in such a manner as to provide the highest uniform brightness as seen by the viewer over as wide as possible viewing angle, or predetermined viewing angle (a viewing angle of 90° will provide for the majority of viewers, that is, 45° on either side of the projection axis perpendicular to the screen) and do this with a minimum adsorption of light, absence of color change, and absence of visible surface textures.

Hence, the primary object of the present invention is to provide control of the brightness distribution and utilize the maximum amount of screen illumination to provide substantially uniform brightness in a desired or selected pre-set viewing angle.

As used herein the term "specular" is intended to mean a highly reflecting surface having a narrow scattering angle and having the other characteristics of a metallic reflector, without limitation as to surface finish. For example, such a surface may be formed by flaked metallic coatings, such as aluminum or silver particles, evaporated metallic surfaces, or chemically deposited materials.

The term "substantially non-stretching" as used in the following claims with respect to the screen material is intended to mean that the screen material will not stretch, in the sense of deformation, under conditions of ordinary and expected use.

Although but one specific embodiment of this invention is herein shown and described it will be understood that details of the structure shown may be altered or omitted without departing from the spirit of this invention as defined by the following claims.

We claim:

1. A projection picture screen comprising a generally planar body of flexible substantially non-stretching sheet material having one face provided with a specular surface defining an image reflecting area, said one face being permanently formed to provide a multiplicity of parallel contiguous flat surface elements of equal widths each extending from margin to margin of said area in the ordinarily vertical direction thereof, said elements being arranged in side-by-side relation over said area and being angulated in alternately opposite directions with respect to the plane of said body to intersect said plane at substantially the same angle, and said flat elements being of such width as to be beyond the visual resolving power of an observer at a predetermined minimum viewing distance.

2. A projection picture screen comprising a generally planar body of a flexible substantially non-stretching sheet material having one face provided with a specular surface defining an image reflecting area, said one face being permanently formed to provide a multiplicity of parallel elongate flat surface elements of equal width arranged in side-by-side relation over said area and each extending from margin to margin of said area in the ordinarily vertical direction thereof, said elements being angulated in alternately opposite directions with respect to the plane of said body to intersect said plane at substantially the same angle, and said flat elements being of such width as to be beyond the visual resolving power of an observer at a predetermined minimum viewing distance, the juncture of each of said elements with the next adjacent element being curved in a transverse plane normal to the plane of said body.

3. A projection screen comprising a generally planar body of flexible substantially non-stretching sheet material having one face provided with a specular surface defining an image reflecting area, said one face being permanently formed to provide a multiplicity of parallel elongate flat surface elements arranged in side-by-side relation over said area and each extending from margin to margin of said area in the vertical direction thereof, said elements being angulated in alternately opposite directions with respect to the plane of said one face to intersect said plane at substantially the same angle, and said elements intersecting each other to form parallel ridges projecting outwardly from the plane of said one face, said elements being of equal width and the space between the crests of adjacent ridges being not greater than three sixty-fourths of an inch.

4. A projection picture screen comprising a generally planar body of a flexible substantially non-stretching sheet material having one face provided with a specular surface defining an image reflecting area, said one face within said area being permanently formed to provide a multiplicity of parallel equally spaced ridges extending from margin to margin of said area in the normally vertical direction thereof, said ridges being arranged in side-by-side relation over said area, the adjacent side surfaces of adjacent ridges converging toward the plane of said one face to meet midway between the ridges, and the space between the crests of adjacent ridges being not greater than three sixty-fourths of an inch.

5. A projection picture screen comprising a generally planar body of flexible substantially non-stretching sheet material having one face provided with a specular surface defining an image reflecting area, said one face being permanently formed to provide a multiplicity of parallel flat surface elements arranged in side-by-side relation over said area and each extending from margin to margin of said area in the normally vertical direction thereof, said elements being angulated in alternately opposite directions with respect to the plane of said one face to intersect said plane at an angle within the range of nine degrees to fifteen degrees, and said flat elements being of such width as to be beyond the visual resolving power of an observer at a predetermined minimum viewing distance.

6. A projection picture screen comprising a generally planar body of a flexible substantially non-stretching sheet material having one face provided with a specular surface defining an image reflecting area, said one face being permanently formed to provide a multiplicity of parallel elongate flat reflecting elements arranged in side-by-side relation over said area and each extending from margin to margin of said area in the ordinarily vertical direction thereof, said elements being angulated in alternately opposite directions with respect to the plane of said one face to intersect said plane at an angle not greater than fifteen degrees, said elements intersecting each other to form parallel ridges projecting outwardly from the plane of said one face, and the space between the crests of adjacent ridges being not greater than three sixty-fourths of an inch.

7. A projection picture screen comprising a generally planar body of flexible substantially non-stretching sheet material having one face provided with a specular surface coating defining an image reflecting area, the surface of said area being permanently formed to provide a multiplicity of parallel elongate flat elements arranged in side-by-side relation over said area and each extending from margin to margin of said area in the vertical direction thereof, said elements being angulated in alternately opposite directions with respect to the plane of said one face to intersect said plane at an angle within the range of nine degrees to fifteen degrees, said elements intersecting each other to form parallel ridges projecting outwardly from the plane of said one face, and said elements being of equal width with the space between the crests of adjacent ridges being not greater than three sixty-fourths of an inch.

8. A projection screen comprising a generally planar body of a flexible substantially non-stretching sheet material having one face provided with a specular surface defining an image reflecting area, the surface of said area being permanently formed to provide a multiplicity of parallel elongate flat reflecting elements arranged in side-by-side relation over said area and each extending from margin to margin of said area in the ordinarily vertical direction thereof, said elements being angulated in alternately opposite directions with respect to the plane of said one face to intersect said plane at an angle not greater than fifteen degrees and not less than nine degrees, said elements being of equal width and intersecting each other to form parallel ridges projecting outwardly from the plane of said one face, the space between the crests of adjacent ridges being not greater than three sixty-fourths of an inch, and the juncture of each of said elements with the next adjacent element being rounded in a transverse plane normal to the plane of said one face.

References Cited in the file of this patent

UNITED STATES PATENTS

| | | |
|---|---|---|
| 1,528,533 | Davis | Mar. 3, 1925 |
| 1,568,023 | Mc Manus et al. | Dec. 29, 1925 |
| 1,854,864 | Semenitz | Apr. 19, 1932 |
| 1,983,626 | Lytle | Dec. 11, 1934 |
| 2,036,146 | Kampfer | Mar. 31, 1936 |
| 2,256,692 | Stableford | Sept. 23, 1941 |